US008663060B2

(12) United States Patent
Cline

(10) Patent No.: US 8,663,060 B2
(45) Date of Patent: Mar. 4, 2014

(54) EPICYCLIC JOINT

(76) Inventor: Robert Cline, Bettendorf, IA (US)

( * ) Notice: Subject to any disclaimer, the term of this patent is extended or adjusted under 35 U.S.C. 154(b) by 164 days.

(21) Appl. No.: 13/125,803

(22) PCT Filed: Oct. 22, 2009

(86) PCT No.: PCT/US2009/061737
§ 371 (c)(1),
(2), (4) Date: Apr. 22, 2011

(87) PCT Pub. No.: WO2010/048450
PCT Pub. Date: Apr. 29, 2010

(65) Prior Publication Data
US 2011/0201471 A1    Aug. 18, 2011

Related U.S. Application Data

(60) Provisional application No. 61/197,074, filed on Oct. 23, 2008.

(51) Int. Cl.
*F16H 57/08* (2006.01)
(52) U.S. Cl.
USPC .......................................... 475/336; 475/243
(58) Field of Classification Search
USPC ........... 475/15, 220, 221, 225, 230, 243, 329, 475/330, 336
See application file for complete search history.

(56) References Cited

U.S. PATENT DOCUMENTS

| | | | | | |
|---|---|---|---|---|---|
| 2,403,102 | A | * | 7/1946 | Plotkin | 244/102 R |
| 2,473,362 | A | * | 6/1949 | Cook | 244/102 R |
| 3,161,241 | A | * | 12/1964 | Allen et al. | 173/14 |
| 5,222,409 | A | * | 6/1993 | Dalakian | 74/479.01 |
| 5,498,208 | A | | 3/1996 | Braun | |
| 5,679,089 | A | | 10/1997 | Levedahl | |
| 6,183,388 | B1 | | 2/2001 | Hawkins | |
| 8,327,959 | B2 | * | 12/2012 | Lee et al. | 180/8.6 |
| 2005/0013656 | A1 | | 1/2005 | Sotiror | |
| 2005/0275367 | A1 | * | 12/2005 | Buehler et al. | 318/568.12 |
| 2006/0011010 | A1 | * | 1/2006 | Koyama et al. | 74/490.05 |

FOREIGN PATENT DOCUMENTS

JP        10-131977 A        5/1998

* cited by examiner

*Primary Examiner* — Justin Holmes
(74) *Attorney, Agent, or Firm* — Hamilton IP Law; Jay R. Hamilton; Charles A. Damschen

(57) ABSTRACT

The various embodiments disclosed and pictured herein are directed to an epicyclic joint with at least one axis of rotation. The epicyclic joint includes rotational members mounted to frame members in such a manner that rotational energy may be transposed along multiple axes of rotation without the need for the frame members to rotate. Epicyclic gear sets and compensation gears and shafts are employed to mitigate vibration, stress, and perturbation of the rotating members when the orientation of the epicyclic joint is varied along any of the axes of rotation. Planetary gear sets or differential gear sets may be used with the epicyclic joint, as may spur gears and miter gears.

17 Claims, 9 Drawing Sheets

EPICYCLIC JOINT

CROSS REFERENCE TO RELATED APPLICATIONS

This application claims the filing benefit under 35 U.S.C. §119(e) of provisional U.S. Patent Application Ser. No. 61/197,074 filed on Oct. 23, 2008, as well as International Patent Application No. PCT/US09/61737, both of which are incorporated herein in their entirety.

FIELD OF INVENTION

The present invention relates to an apparatus for an epicyclic joint. More specifically, the present invention provides a wide angle, constant power, multi-axis joint with epicyclic gearing.

STATEMENT REGARDING FEDERALLY SPONSORED RESEARCH OR DEVELOPMENT

No federal funds were used to develop or create the invention disclosed and described in the patent application.

REFERENCE TO SEQUENCE LISTING, A TABLE, OR A COMPUTER PROGRAM LISTING COMPACT DISK APPENDIX

Not Applicable

AUTHORIZATION PURSUANT TO 37 C.F.R. §1.72(d)

A portion of the disclosure of this patent document contains material which is subject to copyright and trademark protection. The copyright owner has no objection to the facsimile reproduction by anyone of the patent document or the patent disclosure, as it appears in the Patent and Trademark Office patent file or records, but otherwise reserves all copyrights whatsoever.

BRIEF DESCRIPTION OF THE FIGURES

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limited of its scope, the invention will be described and explained with additional specificity and detail through the use of the accompanying drawings.

DETAILED DESCRIPTION

Listing of Elements

Figure 1:
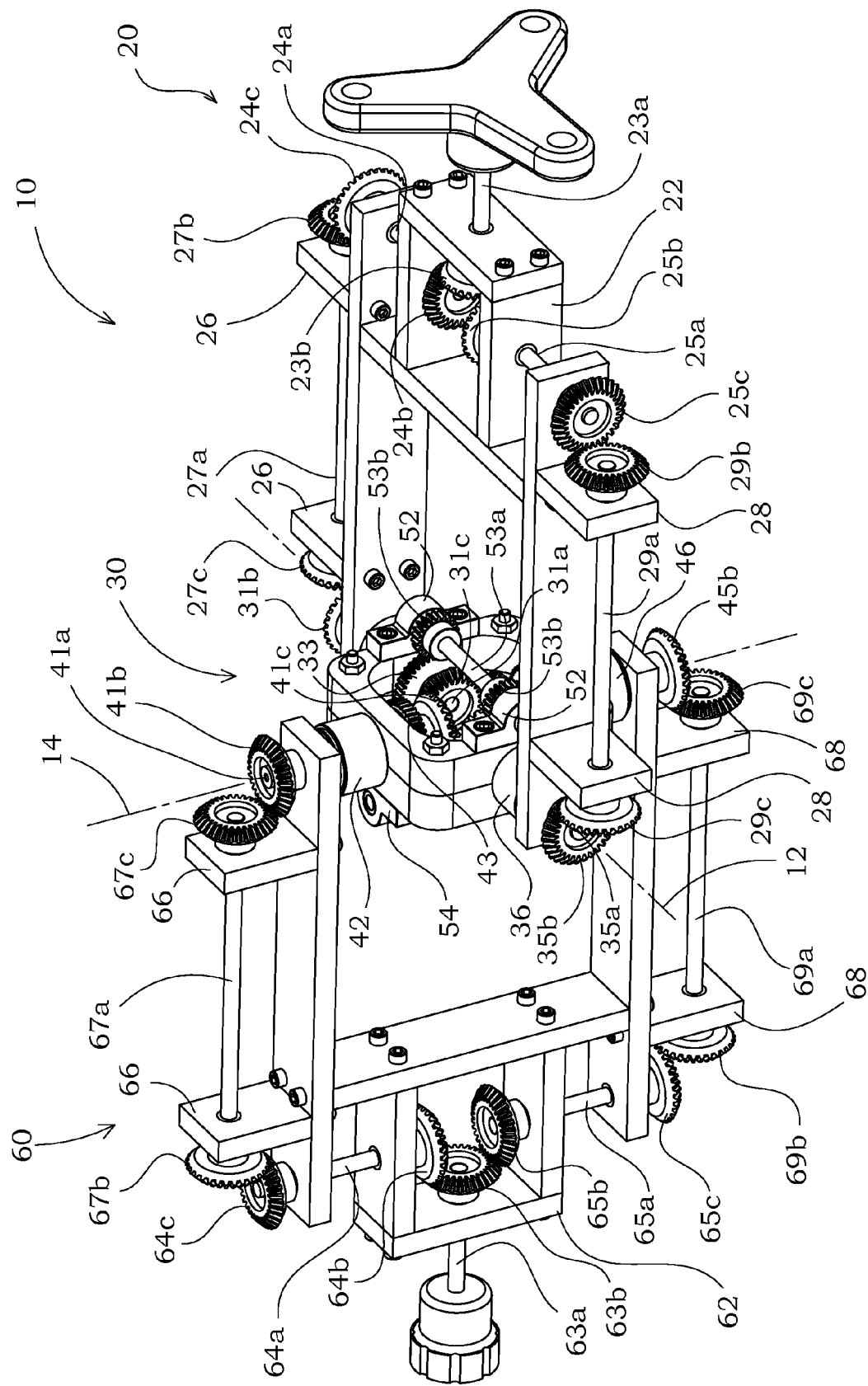
FIG. 1 provides a perspective view of one embodiment of a multi-axis epicyclic joint not rotated about either axis of rotation.
Figure 2:
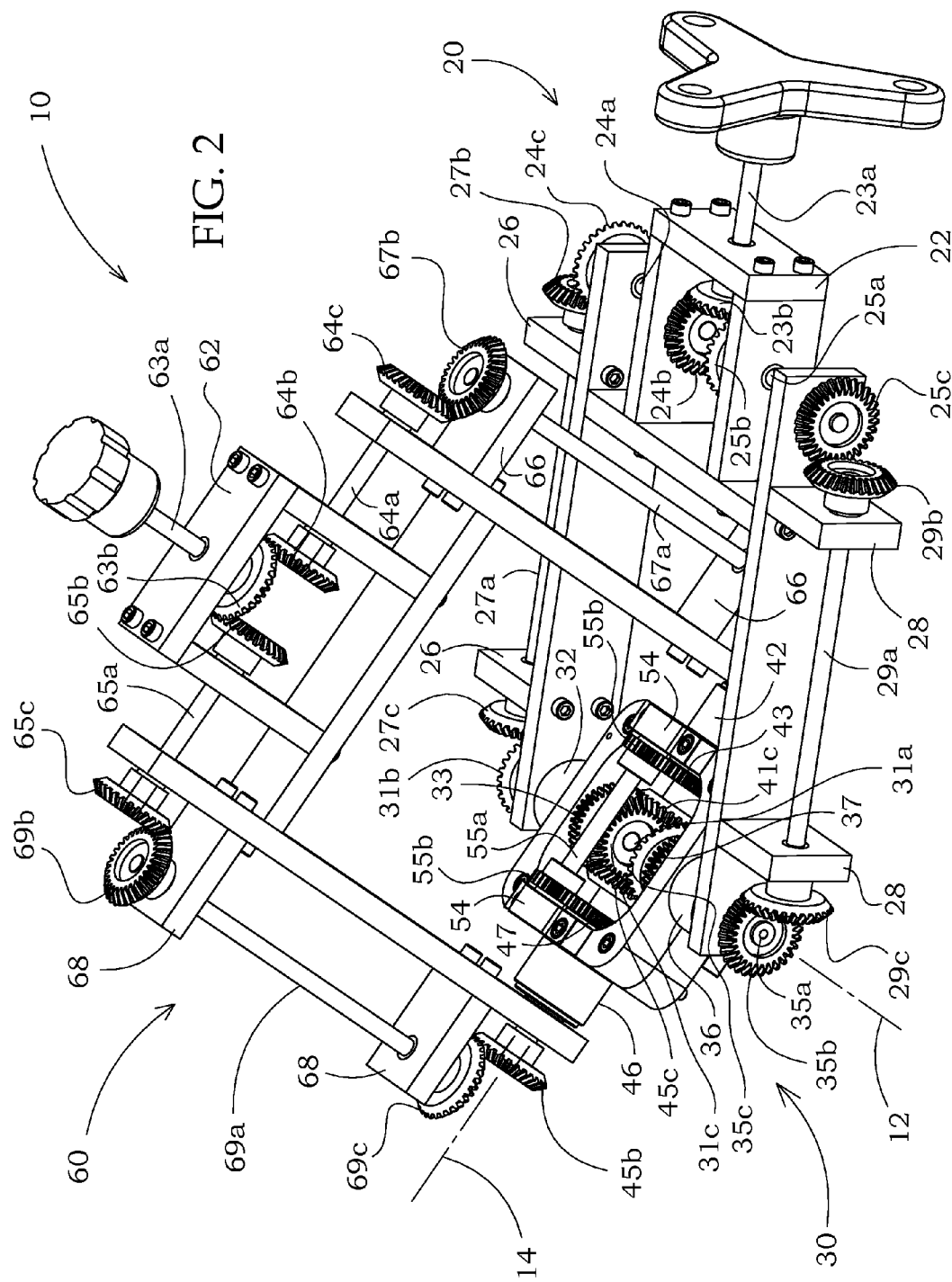
FIG. 2 provides another perspective view of one embodiment of a multi-axis epicyclic joint at an extreme position about the first axis of rotation and not rotated about the second axis of rotation.
Figure 3:
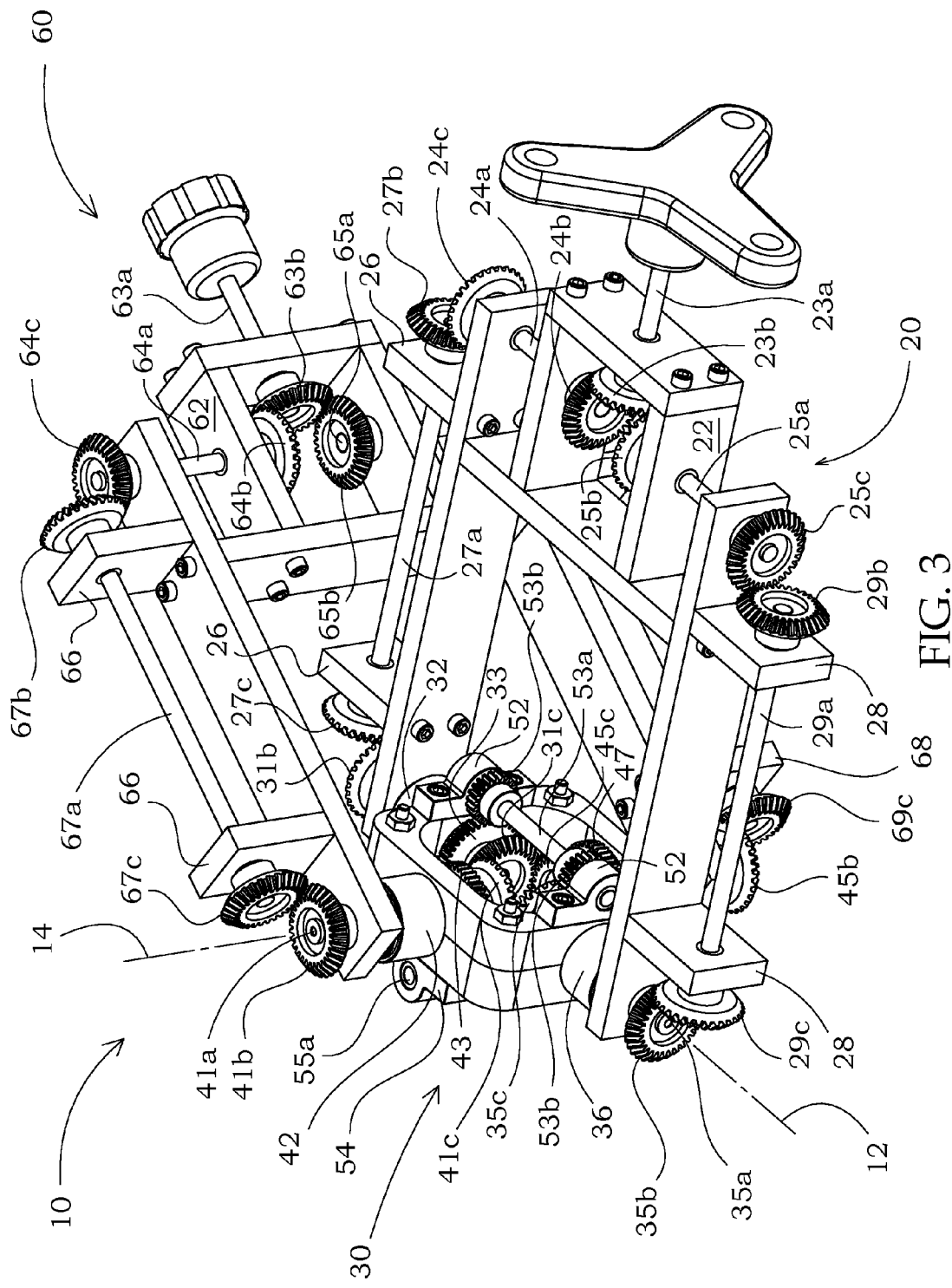
FIG. 3 provides another perspective view of one embodiment of a multi-axis epicyclic joint not rotated about the first axis of rotation and at an extreme position about the second axis of rotation.
Figure 4:
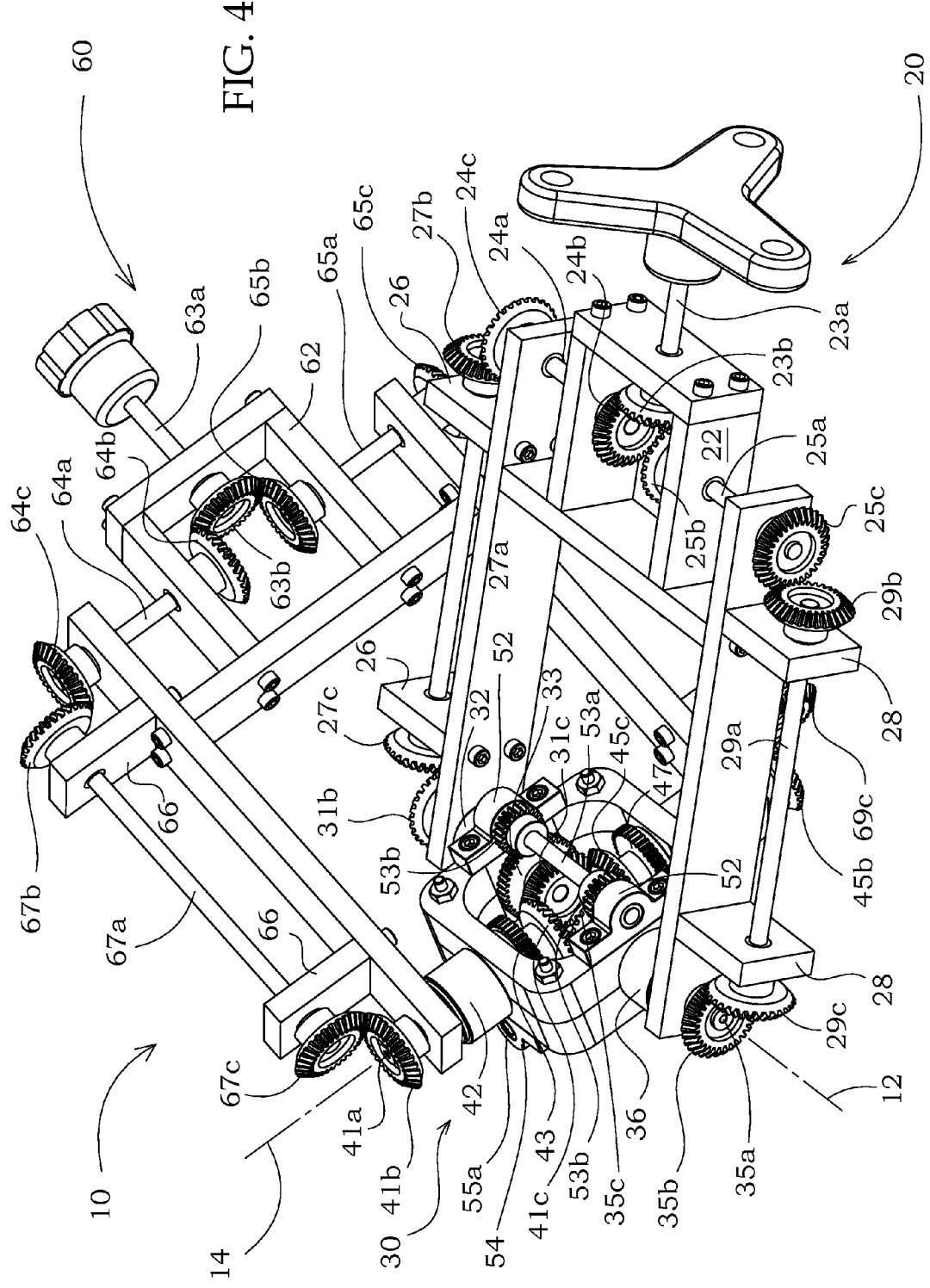
FIG. 4 provides another perspective view of one embodiment of a multi-axis epicyclic joint at an extreme position about the first axis of rotation and an extreme position about the second axis of rotation.
Figure 5A:
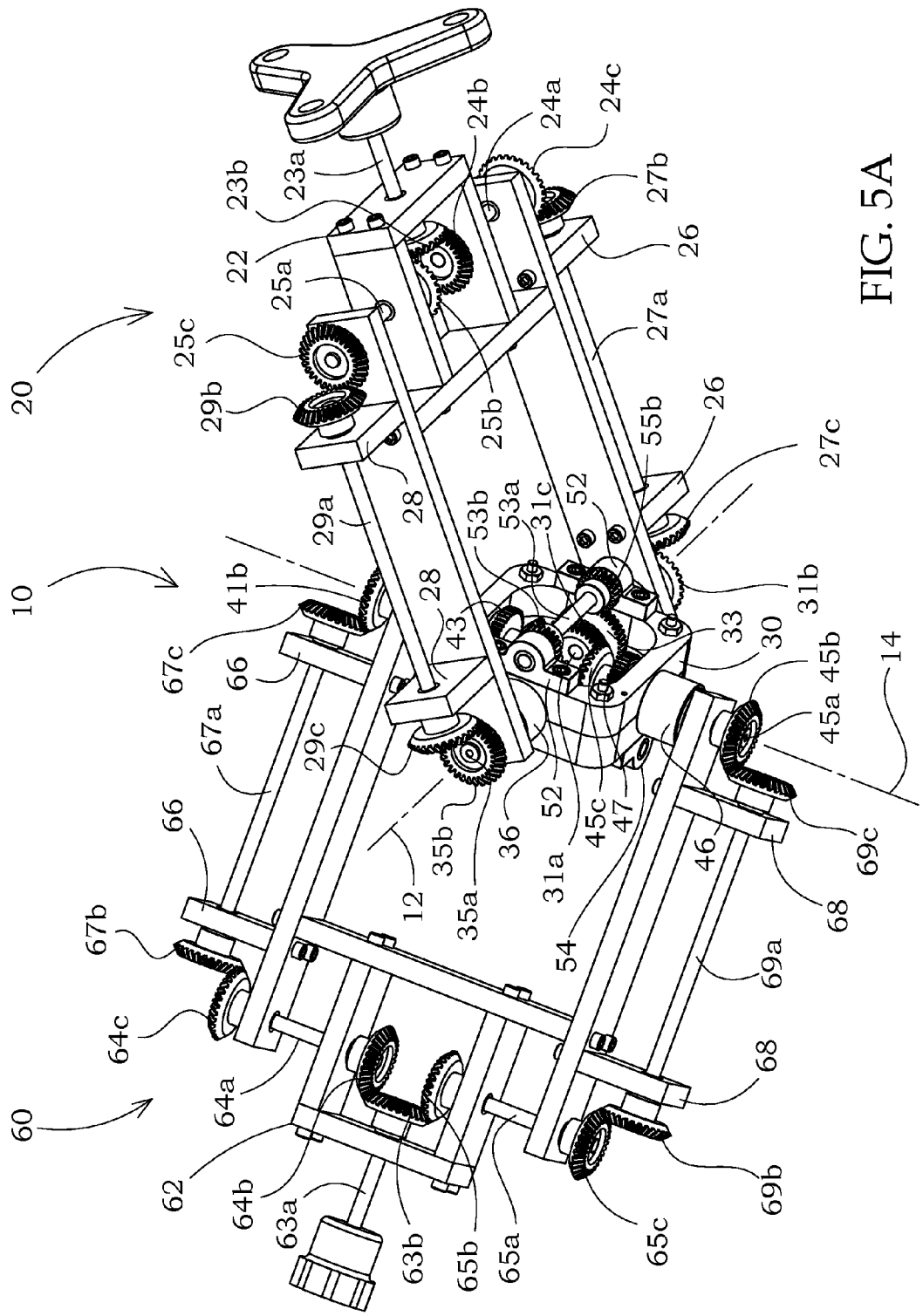
FIG. 5A provides a perspective view of one embodiment of a multi-axis epicyclic joint at an intermediate position about the first axis of rotation and an intermediate position about the second axis of rotation.
Figure 5B:
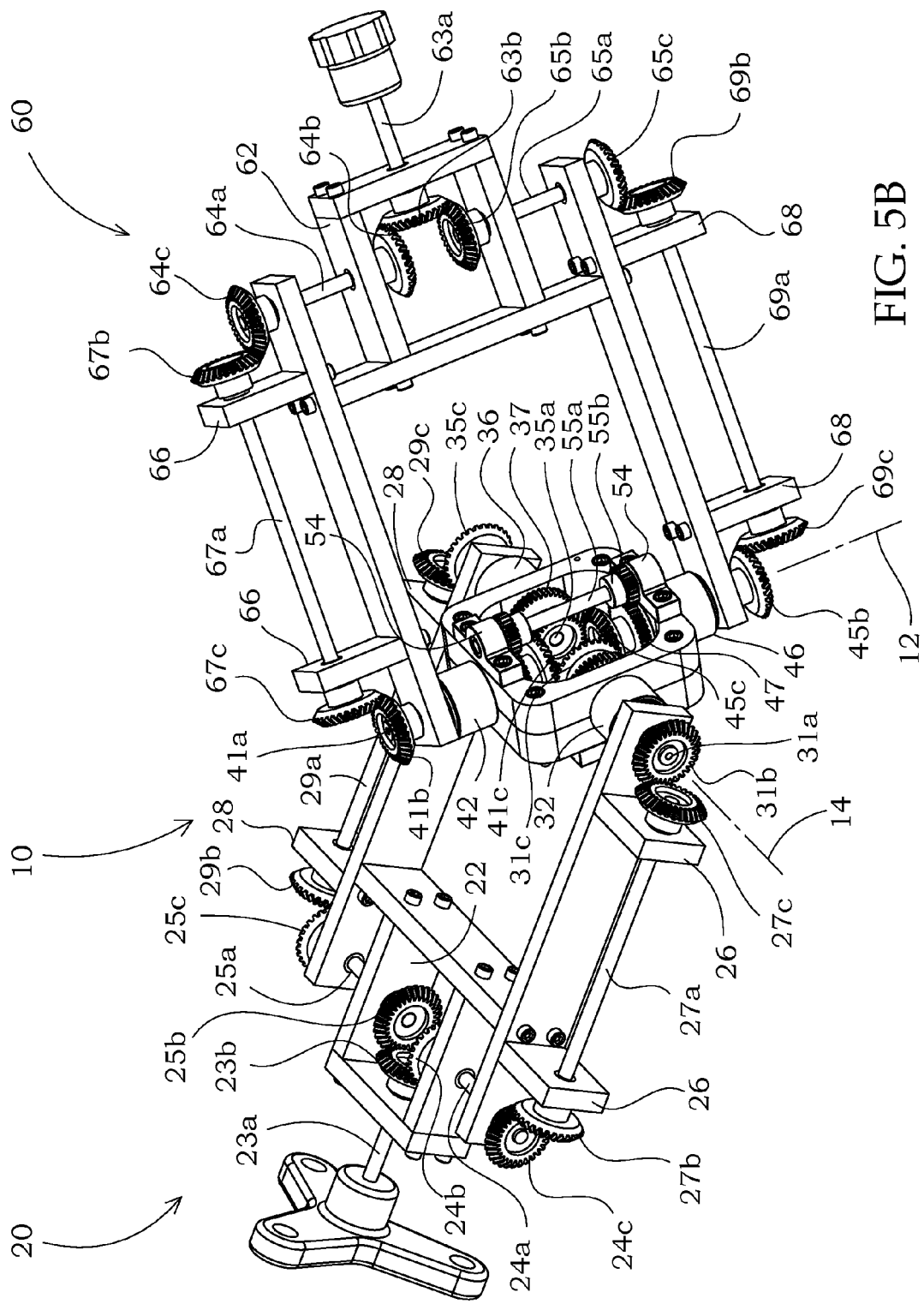
FIG. 5B provides another perspective view of one embodiment of a multi-axis epicyclic joint at an intermediate position about the first axis of rotation and an intermediate position about the second axis of rotation.

| ELEMENT DESCRIPTION | ELEMENT # |
|---|---|
| Epicyclic joint | 10 |
| First axis of rotation | 12 |
| Second axis of rotation | 14 |
| First frame | 20 |
| First frame splitter support | 22 |
| Input shaft | 23a |
| Input gear | 23b |
| Right split shaft | 24a |
| First right split gear | 24b |
| Second right split gear | 24c |
| Left split shaft | 25a |
| First left split gear | 25b |
| Second left split gear | 25c |
| Right transfer support | 26 |
| Right transfer shaft | 27a |
| First right transfer gear | 27b |
| Second right transfer gear | 27c |
| Left transfer support | 28 |
| Left transfer shaft | 29a |
| First left transfer gear | 29b |
| Second left transfer gear | 29c |
| Center frame | 30 |
| Right center shaft | 31a |
| First right miter gear | 31b |
| Second right miter gear | 31c |
| Right planetary gear head | 32 |
| Right spur gear | 33 |
| Left center shaft | 35a |
| First left miter gear | 35b |
| Second left miter gear | 35c |
| Left planetary gear head | 36 |
| Left spur gear | 37 |
| Center frame journal | 38 |
| Top center shaft | 41a |
| First top miter gear | 41b |
| Second top miter gear | 41c |
| Top planetary gear head | 42 |
| Top spur gear | 43 |
| Bottom center shaft | 45a |
| First bottom miter gear | 45b |
| Second bottom miter gear | 45c |
| Bottom planetary gear head | 46 |
| Bottom spur gear | 47 |
| First compensation shaft support | 52 |
| First compensation shaft | 53a |

-continued

| ELEMENT DESCRIPTION | ELEMENT # |
|---|---|
| First compensation gear | 53b |
| Second compensation shaft support | 54 |
| Second compensation shaft | 55a |
| Second compensation gear | 55b |
| Second frame | 60 |
| Second frame splitter support | 62 |
| Output shaft | 63a |
| Output gear | 63b |
| Top split shaft | 64a |
| First top split gear | 64b |
| Second top split gear | 64c |
| Bottom split shaft | 65a |
| First bottom split gear | 65b |
| Second bottom split gear | 65c |
| Top transfer support | 66 |
| Top transfer shaft | 67a |
| First top transfer gear | 67b |
| Second top transfer gear | 67c |
| Bottom transfer support | 68 |
| Bottom transfer shaft | 69a |
| First bottom transfer gear | 69b |
| Second bottom transfer gear | 69c |
| Planetary gear head | 70 |
| Input shaft | 71 |
| Sun gear | 72 |
| Planet carrier | 73 |
| Planet gear | 74 |
| Annulus | 75 |
| Annulus recess | 76 |

DETAILED DESCRIPTION

Before the various embodiments of the present invention are explained in detail, it is to be understood that the invention is not limited in its application to the details of construction and the arrangements of components set forth in the following description or illustrated in the drawings. The invention is capable of other embodiments and of being practiced or of being carried out in various ways. Also, it is to be understood that phraseology and terminology used herein with reference to device or element orientation (such as, for example, terms like "front", "back", "up", "down", "top", "bottom", and the like) are only used to simplify description of the present invention, and do not alone indicate or imply that the device or element referred to must have a particular orientation. In addition, terms such as "first", "second", and "third" are used herein and in the appended claims for purposes of description and are not intended to indicate or imply relative importance or significance.

General Description of the Components

A description of the several components required for one embodiment of the epicyclic joint follows. A more detailed description of the operation and relation of the several elements are disclosed in the figures and the remainder of the specification.

It is contemplated that one type of epicyclic gearing system that may be used with the epicyclic joint 10 is a planetary gearing system. Planetary gearing systems typically include one sun gear and a plurality of planet gears. Such gearing systems are well known to those skilled in the art and therefore will not be described in further detail herein for purposes of clarity. U.S. Pat. Nos. 4,644,822, 4,618,022, and 4,727,954, all of which are incorporated by reference herein in their entireties, disclose common uses of planetary gear sets. Another type of epicyclic gearing system that may be used with the epicyclic joint 10 is a common differential with beveled gears. U.S. Pat. Nos. 2,608,261 and 3,400,610, both of which are incorporated by reference herein in their entireties, disclose apparatuses using differentials with beveled gears. Accordingly, the scope of the epicyclic joint 10 is not limited by the type of epicyclic gearing and/or gear sets used, and any such gearing and/or gear sets known to those skilled in the art may be used without departing from the spirit and scope of the epicyclic joint 10 as disclosed herein.

Operation of the Exemplary Embodiment

Referring now to the drawings, wherein like reference numerals designate identical or corresponding parts throughout the several views, FIGS. 1-5 provide perspective views of one embodiment of the epicyclic joint 10. In the embodiment of the epicyclic joint 10 shown in FIGS. 1-5, the epicyclic joint 10 operates to allow a rotational energy input from the input shaft 23a to be rotated about a first axis of rotation 12 and a second axis of rotation 14 to an output shaft 63a. However, the epicyclic joint 10 may be configured for a single axis of rotation or for more than two axes of rotation within the spirit and scope of the epicyclic joint 10 as disclosed and claimed herein.

The embodiment of the epicyclic joint 10 pictured herein is comprised of three main portions: (1) a first frame 20 and the elements associated therewith (generally horizontally oriented in FIGS. 1-5); (2) a central frame 30 and the elements associated therewith; and, (3) a second frame 60 and the elements associated therewith (generally vertically oriented in FIGS. 1-5). The first frame 20 is pivotally mounted to the central frame 30 about the first axis of rotation 12, and the second frame 60 is pivotally mounted to the central frame 30 about the second axis of rotation 14. The first axis of rotation 12 and the second axis of rotation 14 are perpendicular to one another in the embodiment of the epicyclic joint 10 pictured herein, although other it may be configured for other orientations without departing from the spirit and scope of the epicyclic joint 10 as disclosed and claimed herein. In an embodiment not pictured herein, the epicyclic joint 10 includes only one axis of rotation, and in another embodiment not pictured herein, the epicyclic joint 10 includes more than two axes of rotation.

The first frame 20 in the embodiment shown is generally U-shaped, and includes a first frame splitter support 22, which in the embodiment pictured herein is comprised of U-shaped member wherein each surface is perpendicular to the adjacent surface. Right and left transfer supports 26, 28, respectively, may be mounted to each side of the first frame 20. These various elements of the first frame 20 may be separately formed and then joined together, or they may be integrally formed as one continuous structure. Furthermore, the orientations and/or configurations of the various elements of the first frame 20 may be different in other embodiments not pictured herein. The material used to construct the main frame 20 and/or the various components thereof may be any material known to those skilled in the art and suitable for the particular application. Such materials may include metals, alloys, synthetic materials such as polymers, wood, combinations thereof, or any other material known to those skilled in the art.

As indicated, the first frame 20 may be generally U-shaped, with the first frame splitter support 22 and right and left transfer supports 26, 28 formed as protrusions thereon. An input shaft 23a is rotatably mounted to the first frame 20, as shown in FIG. 1. Affixed to and rotatable with one end of the input shaft 23a is an input gear 23b, which is formed as a miter gear in the embodiment pictured herein. As rotational force is applied to the input shaft 23a, that force is directly communicated to the input gear 23b. A miter gear is one type of rotational translator that may be used with the epicyclic joint 10.

Intermeshed with the input gear 23b are a first right split gear 24b and a first left split gear 25b The first right and left split gears 24b, 25b rotate about an axes that is perpendicular to that of the input gear 23b. Accordingly, it will be obvious to those skilled in the art that as the input gear 23b rotates, it causes the right and left first split gears 24b, 25b to rotate in opposite directions. The first right split gear 24b is affixed to and rotatable with a right split shaft 24a, which may be pivotally mounted to said first frame splitter support 22 in the embodiment pictured herein. The first left split gear 25b is affixed to and rotatable with a left split shaft 25a, which also may be pivotally mounted to said first frame splitter support 22 in the embodiment pictured herein. Also affixed to the right split shaft 24a and rotatable therewith is a second right split gear 24c, and a second left split gear 25c is affixed to and rotatable with the left split shaft 25a. Accordingly, the right split shaft 24a and associated components and left split shaft 25a and associated components are one type of symmetrical splitter that may be used with the epicyclic joint 10 to divide the rotational energy of the input shaft 22 and translate that energy by ninety degrees. The first and second right split gears 24b, 24c, first and second left split gears 25b, 25c are one type of rotational energy dividing member, but other structures and/or methods known to those skilled in the art may be used to divide the rotational energy of the input shaft 22 as described in detail below.

A right transfer support 26 may be affixed to the first frame 20, and a complimentary left transfer support 28 may also be affixed to the first frame 20. A right transfer shaft 27a may be pivotally mounted to the right transfer support 26 and a left transfer shaft 29a may be pivotally mounted to the left transfer support 28, as in the embodiment pictured in FIGS. 1-5. A first right transfer gear 27b may be mounted to and rotatable with one end of the right transfer shaft 27a so that the first right transfer gear 27b intermeshes with the second right split gear 24b. A first left transfer gear 29b may be mounted to and rotatable with one end of the left transfer shaft 29a so that the first left transfer gear 29b intermeshed with the second left split gear 25b. Accordingly, the right transfer shaft 27a together with the first and second right transfer gears 27b, 27c comprise one type of transfer member, as do the left transfer shaft 29a together with the first and second right transfer gears 29b, 29c.

Figure 6A:
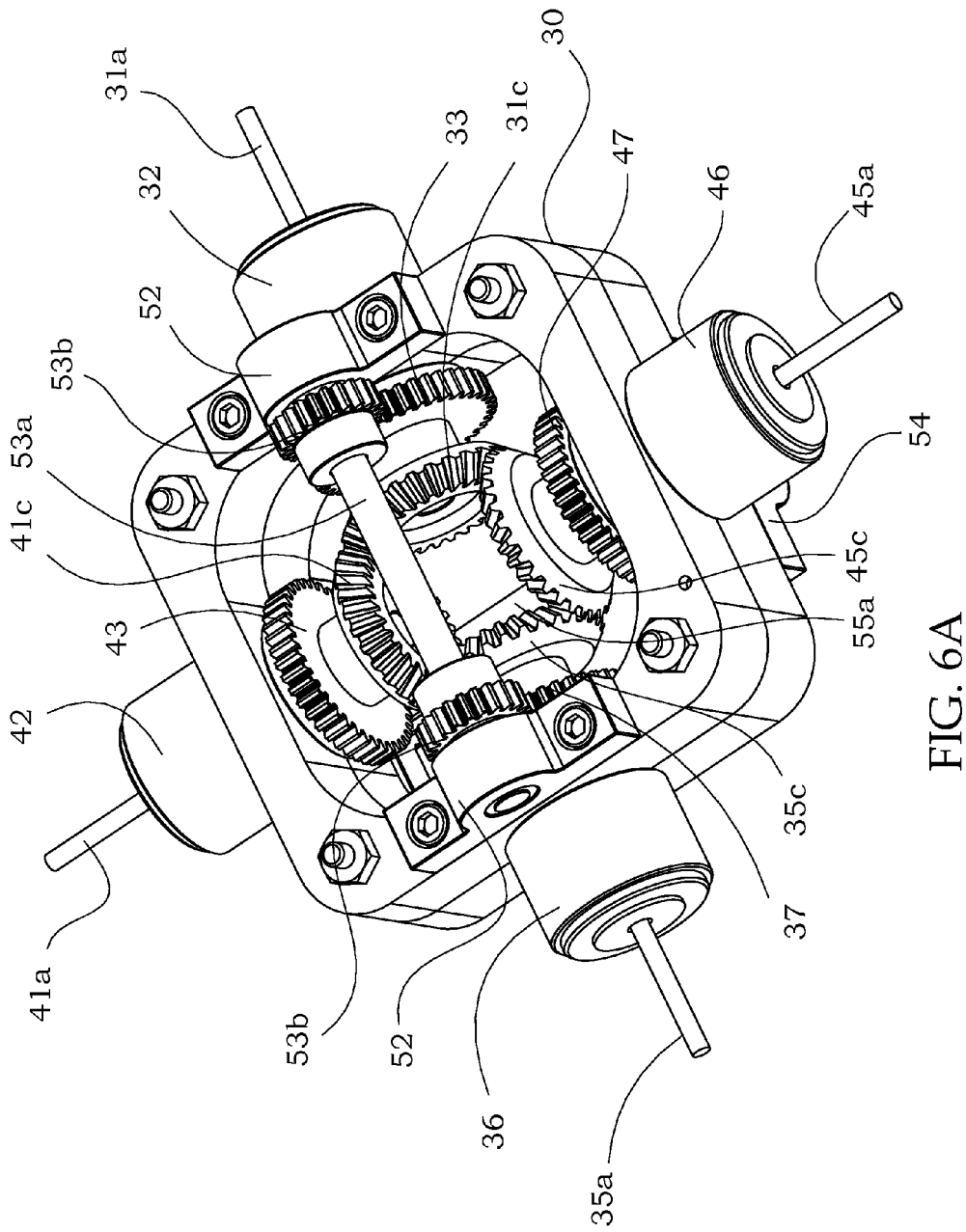
FIG. 6A provides a detailed view of one embodiment of a center frame that may be used with a multi-axis epicyclic joint.
Figure 6B:
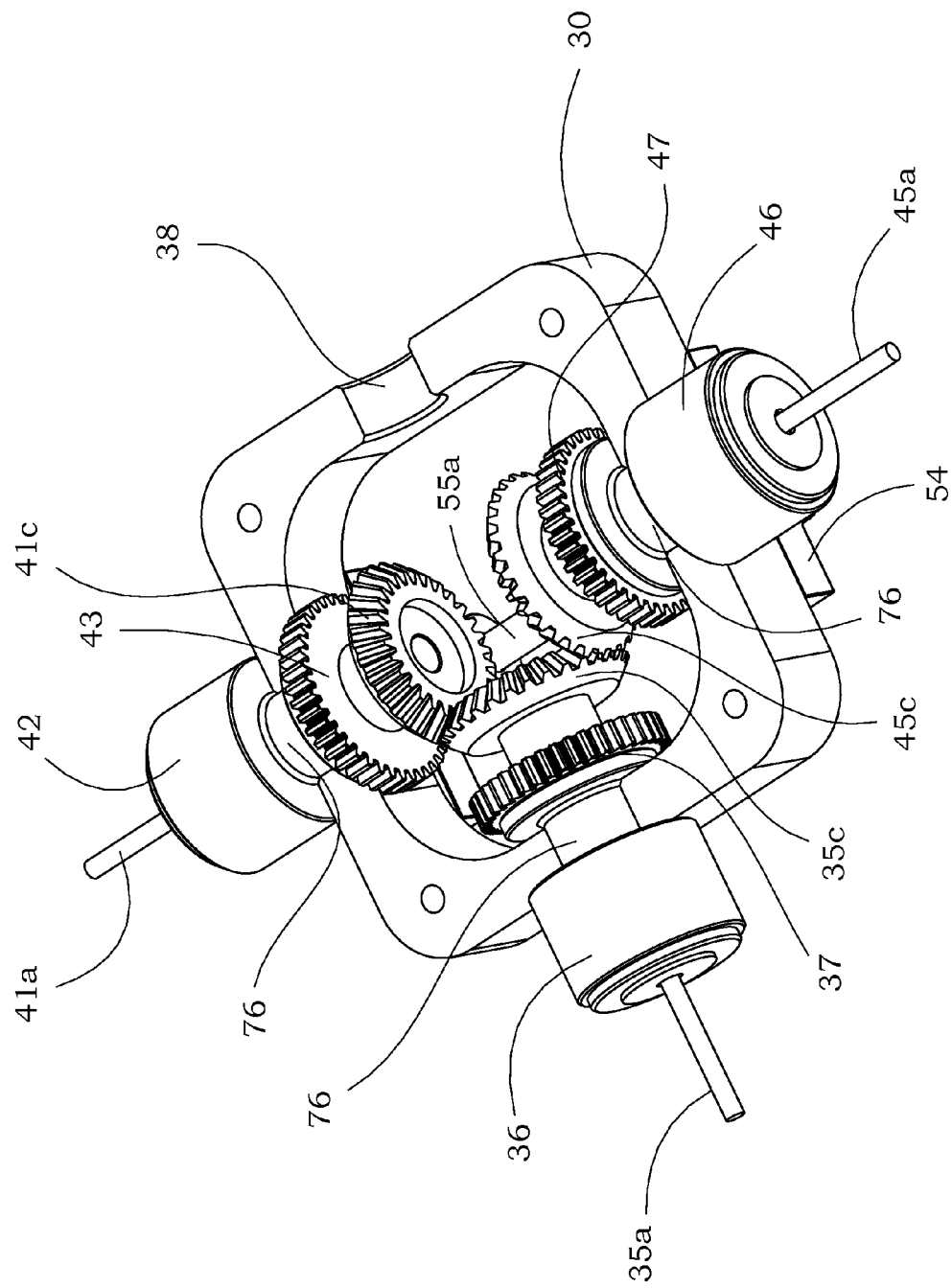
FIG. 6B provides a partial exploded view of one embodiment of a center frame that may be used with a multi-axis epicyclic joint.

A center frame 30 may be positioned adjacent the first frame 20 on the end thereof that is opposite the input shaft 23a. One embodiment of the center frame 30 is shown in detail in FIGS. 6A and 6B, in which embodiment the center frame 30 is generally square in shape. As with the first frame 20, the components of the center frame 30 may be separately formed and then joined together, or they may be integrally formed as one continuous structure. The material used to construct the center frame 30 and/or the various components thereof may be any material known to those skilled in the art and suitable for the particular application. Such materials may include metals, alloys, synthetic materials such as polymers, wood, combinations thereof, or any other material known to those skilled in the art.

In the embodiment pictured herein, the first frame 20 is engaged with the center frame 30 via the cooperation of the right center shaft 31a, left center shaft 35a, right planetary gearhead 32, and left planetary gearhead 36. The right center shaft 31a may be pivotally supported by the first frame 20, and a first right miter gear 31b may be affixed to and rotatable with the right center shaft 31a. The left center shaft 35a may be pivotally supported by the first frame 20, and a first left miter gear 35b may be affixed to and rotatable with the left center shaft 35a.

Figure 7B:
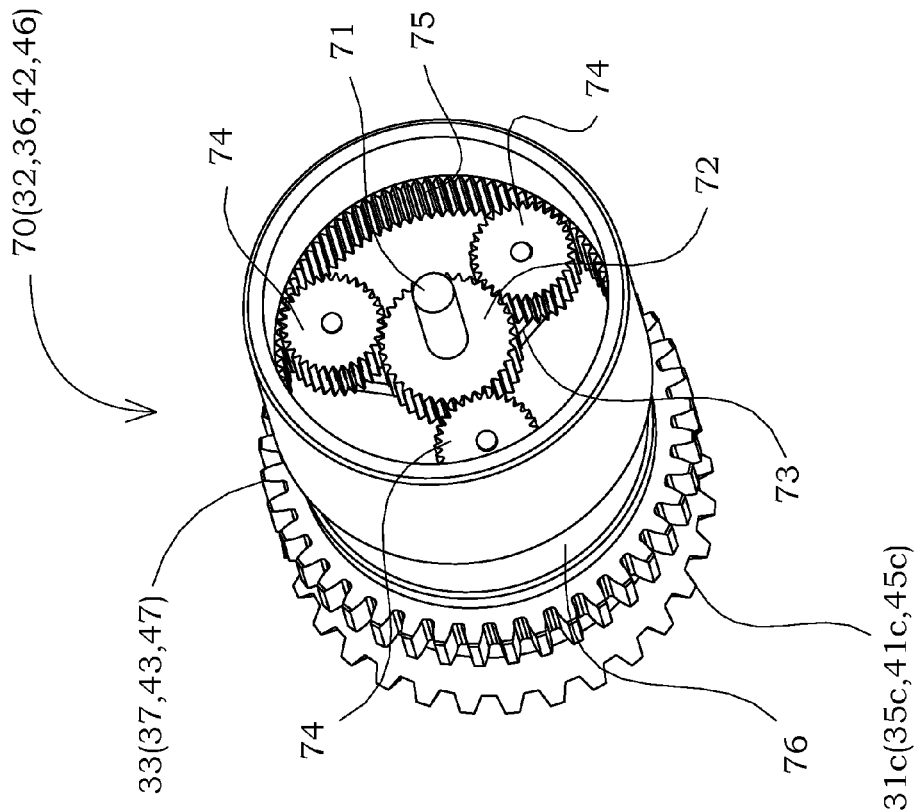
FIG. 7B provides a perspective view of one embodiment of a planetary gear head that may be used with a multi-axis epicyclic joint.
Figure 7A:
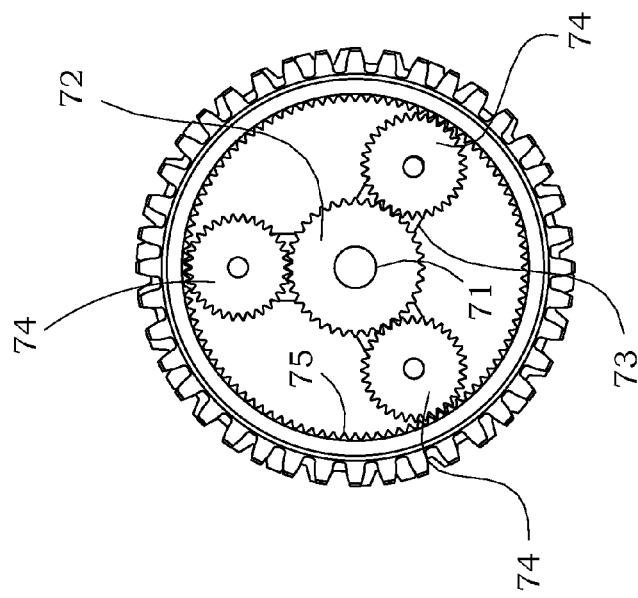
FIG. 7A provides an end view of one embodiment of a planetary gear head that may be used with a multi-axis epicyclic joint.

A right planetary gearhead 32 may be positioned adjacent the first right miter gear 31b. One type of planetary gearhead 70 that may be used with the epicyclic joint as disclosed herein is shown in FIGS. 7A and 7B. The planetary gearhead 70 shown in FIGS. 7A and 7B includes a sun gear 72 that may be affixed to and rotatable with the input shaft 71 (e.g., the right center shaft 31a in an embodiment of the right planetary gearhead 32). In a typically planetary gearhead 70, a plurality of planet gears 74 (three in the embodiment shown in FIGS. 7A and 7B, but which may be greater or fewer in other embodiments not pictured herein) are pivotally mounted to a planet carrier 73, and the planet gears 74 are intermeshed with the sun gear 72. An annulus 75 may be placed around the planet carrier 73 such that the annulus also is intermeshed with the planet gears 74. The exterior surface of the annulus 75 includes an annulus recess 76, which may be fashioned to pivotally engage a center frame journal 38. In the embodiment of the planetary gearhead 70 shown in FIGS. 7A and 7B, the size and configuration of the sun gear 72, planet gears 74, and annulus 75 result in a three-to-one reduction in the rotational speed of the planet carrier 73 with respect to the sun gear 72 (and input shaft 71, accordingly). However, because the embodiment of the epicyclic joint 10 shown herein transfers rotational energy from an input shaft 71 to a planet carrier 73, and then from another planet carrier 73 back to an input shaft 71 (via the interaction of the second right miter gear 31c, second left miter gear 35c, second top miter gear 41c, and second bottom miter gear 45c), the rotational speed of the output shaft 63a on the second frame 60 is equal to that of the input shaft 23a on the first frame 20. This ratio may be different in other embodiments of the epicyclic joint 10, and is therefore in no way limiting.

In the embodiment of the epicyclic joint 10 pictured in FIGS. 1-5, right planetary gearhead 32 is pivotally mounted to the center frame 30 about the center frame journal 38 formed in the right side of the center frame 30. The sun gear 72 in the right planetary gearhead 32 may be affixed to and rotatable with the right center shaft 31a. The planet carrier 73 in the right planetary gearhead 32 may be affixed to and rotatable with the second right miter gear 31c. A right spur gear 33 may be affixed to and rotatable with the annulus 75 of the right planetary gearhead 32.

A first compensation shaft support 52 may be affixed to the center frame 30. A first compensation shaft 53a may be pivotally supported by the first compensation shaft support 52. In the embodiment shown in FIGS. 1-5, two first compensation gears 53b are affixed to and rotatable with the first compensation shaft 53a. One first compensation gear 53b may be intermeshed with the right spur gear 33 and the other first compensation gear 53b may be intermeshed with the left spur gear 37, which is explained in detail below. The first compensation shaft support 52 may be affixed elsewhere on the epicyclic joint 10 in other embodiments thereof not pictured herein. The first compensation shaft support 52 may have any convenient orientation or configuration as long as it does not interfere with the other components of the epicyclic joint 10 and allows the appropriate components to engage one another In a manner analogous to the right planetary gearhead 32, a left planetary gearhead 36 may be positioned adjacent the first left miter gear 35b. The left planetary gearhead 36 may be pivotally mounted to the center frame 30 about the center frame journal 38 formed in the right side of the center frame 30. The sun gear 72 in the right planetary gearhead 36 may be affixed to and rotatable with the left center shaft 35a. The planet carrier 73 in the left planetary gearhead 36 may be affixed to and rotatable with the second left miter gear 35c. A left spur gear 37 may be affixed to and rotatable with the annulus 75 of the left planetary gearhead 36.

Because the planet carrier 73 in the right planetary gearhead 32 rotates in the opposite direction of the planet carrier 73 in the left planetary gearhead 36, the first compensation shaft 53a and first compensation gears 53b bind the right and left planetary gearheads 32, 36 together. As is apparent from the description and various figures included herein, the right center shaft 31a, right planetary gearhead 32, left center shaft 35a, and left planetary gearhead 36 cooperate to engage the first frame 20 with the center frame 30 about a first axis of rotation 12. The first frame 20 is allowed to rotate with respect to the center frame 30 about the first axis of rotation 12 through the cooperation of the right and left planetary gearheads 32, 36 with the first compensation shaft 53a and first compensation gears 53b.

More specifically, because the right spur gear 33 (which is affixed to and rotatable with the annulus 75 of the right planetary gearhead 32) may rotate independently from the second right miter gear 31c (which is affixed to and rotatable with the planet carrier 73 of the right planetary gearhead 32), and because the left spur gear 37 (which is affixed to and rotatable with the annulus 75 of the left planetary gearhead 36) may rotate independently from the second left miter gear 35c (which is affixed to and rotatable with the planet carrier 73 of the left planetary gearhead 36), both by virtue of the epicyclic qualities of the planetary gearhead 70, the first frame 20 may pivot with respect to the center frame 30 about the first axis of rotation 12 (which also causes the annuluses 75 of the right and left planetary gearheads 32, 36 to rotate about their respective center frame journals 38) without lashing of any of the gears in the epicyclic joint 10. During rotation of the first frame 20 with respect to the center frame 30, the first compensation shaft 53a does not rotate, but instead requires that the right and left spur gears 33, 37 rotate in the same direction by the same magnitude, even though the second right miter gear 31c and second left miter gear 35c are counter rotating. Accordingly, a stationary gear may be positioned to intermesh with either the right or left spur gear 33, 37 to achieve the same functionality as that of the epicyclic joint 10 pictured herein.

In an embodiment not pictured herein, a single output gear (not shown) is pivotally supported by the center frame 30 and arranged to intermesh with both the second right and left miter gears 31c, 35c. The single output gear may be affixed and rotatable with an output shaft (not shown), such that the arrangement creates a single-axis epicyclic joint 10. In light of the present disclosure it will become apparent to those skilled in the art that in an embodiment not pictured herein, the right spur gear 33 may be affixed to and rotatable with the planet carrier 73 of the right planetary gearhead 32, and the second right miter gear 31c may be affixed to and rotatable with the annulus 75 of the right planetary gearhead 32 with an analogous configuration for the elements on the left side of the epicyclic joint 10 to yield a similarly functional first axis of rotation 12. Furthermore, it will also become apparent to those skilled in the art in light of the present disclosure that the right and left planetary gearheads 32, 36 and first compensation shaft and gears 53a, 53b may be positioned adjacent the first frame splitter support 22 if spur transfer gears (not shown) are employed in lieu of the right and left transfer shafts and gears 27a, 29a, and 27b, 27c, 29b, 29c, respectively.

As is apparent from the detailed description and several figures included herein, the various elements of the first frame 20 may cooperate to divide a single rotational input into two counter-rotating rotational energy sources with axes of rotation perpendicular to that of the rotational input. Each counter-rotating rotational energy source may then be transferred to an epicyclic gearhead (which is shown as a planetary gearhead 70 in the embodiment pictured herein) and eventually combined to produce an output rotational energy source with an axis of rotation parallel to that of the rotational input.

To yield a second axis of rotation 14 as in the embodiment of the epicyclic joint 10 shown herein, a top and bottom planetary gearhead 42, 46 may be pivotally mounted to the center frame 30 about respective center frame journals 38. The top and bottom portions of the center frame 30 and second frame 60 are analogous to the right and left portions of the center frame 30 and first frame 20, respectively. The top and bottom portions of the center frame 30 and second frame 60 are mirror images of the right and left portions of the center frame 30 and first frame 20 rotated along a horizontal axis by negative ninety degrees. Accordingly, the second top miter gear 41c may be affixed to the planet carrier 73 of the top planetary gearhead 42 and the top spur gear 43 may be affixed to the annulus 75 of the top planetary gearhead 42. The second bottom miter gear 45c may be affixed to the planet carrier 73 of the bottom planetary gearhead 46 and the bottom spur gear 47 may be affixed to the annulus 75 of the bottom planetary gearhead 46. The second top and bottom miter gears 41c, 45c may be intermeshed with both the second right miter gear 31c and second left miter gear 35c, such that the counter-rotating second right and left miter gears 31c, 35c cause the second top and bottom miter gears 41c, 45 c to counter rotate. Accordingly, the configuration of the second right and left miter gears 31c, 35c and second top and bottom miter gears 41c, 45c translate the axis of rotation of the rotational energy by negative ninety degrees (i.e., from horizontal to vertical as shown in the orientation pictured in FIG. 5A).

The rotation of the second top and bottom miter gears 41c, 45c causes the rotation of planet carriers 73 in the top and bottom planetary gearheads 42, 46, respectively. A second compensation shaft support 54 may be affixed to the center frame 30 to pivotally support a second compensation shaft 55a, which second compensation shaft may have two second compensation gears affixed thereto and rotatable therewith. The second compensation shaft support 54 may be affixed elsewhere on the epicyclic joint 10 in other embodiments thereof not pictured herein. The second compensation shaft support 54 may have any convenient orientation or configuration as long as it does not interfere with the other components of the epicyclic joint 10 and allows the appropriate components to engage one another The second compensation gears 55b may be intermeshed with the top and bottom spur gears 43, 47, respectively. Because the top and bottom spur gears 43, 47 may be affixed to and rotatable with the annuluses 75 of the top and bottom planetary gearheads 42, 46, respectively, the configuration of the second compensation shaft and gears 55a, 55b require that the rotation of the planet carrier 73 results in rotation of the sun gear 72 and top and bottom center shafts 41a, 45a. In a manner completely analogous to that explained in detail above for the first frame 20 and center frame 30, the top center shaft 41a (which may be pivotally supported by the second frame 60), top planetary gearhead 42, bottom center shaft 45a (which may be pivotally supported by the second frame 60), and bottom planetary gearhead 46 cooperate to engage the second frame 60 with the center frame 30 about a second axis of rotation 14, which in the embodiment of the epicyclic joint 10 shown herein is perpendicular to the first axis of rotation 12. The second frame 60 is allowed to rotate with respect to the center frame 30 about the second axis of rotation 14 through the cooperation of the top and bottom planetary gearheads 42, 46 with the second compensation shaft 55a and second compensation gears 55b.

The first top miter gear 41b, which may be affixed to and rotatable with the top center shaft 41a (i.e., input shaft 71) and sun gear 72 in the top planetary gearhead 42, may be intermeshed with the second top transfer gear 67c. The first bottom miter gear 45b, which may be affixed to and rotatable with the bottom center shaft 45a (i.e., input shaft 71) and sun gear 72 in the bottom planetary gearhead 46, may be intermeshed with a second bottom transfer gear 69c. This engagement translates the rotational energy with axes of rotation in two primarily vertical directions (in the orientation shown in FIG. 1) to rotational energy with axes of rotation in two primarily horizontal directions (in the orientation shown in FIG. 1).

In a manner analogous to that of the first frame 20, the second top and bottom transfer gears 67c, 69c, may be affixed to and rotatable with top and bottom transfer shafts 67a, 69a, respectively, and first top and bottom transfer gears 67b, 69b, may also be affixed to and rotatable with the top and bottom transfer shafts 67a, 69a, respectively. As in a manner similar to that described above for the first frame 20, the top transfer shaft 67a is pivotally supported by the top transfer support 66, and the bottom transfer shaft 69a is pivotally supported by the bottom transfer support 68. Furthermore, the first top and bottom transfer gears 67b, 69b may be intermeshed with a second top and bottom split gear 64c, 65c respectively. As is readily apparent from FIG. 1, this engagement translates the rotational energy with axes or rotation in two primarily horizontal directions (in the orientation shown in FIG. 1) to rotational energy with axes of rotation in two primarily vertical directions (in the orientation shown in FIG. 1).

The second top and bottom split gears 64c, 65c may be affixed to and rotatable with top and bottom split shafts 64a, 65a, respectively. In the embodiment pictured herein, the top and bottom split shafts 64a, 65a are each pivotally supported by the second frame 60 adjacent the second frame splitter support 62, all of which is completely analogous to the first frame 20. First top and bottom split gears 64b, 65b may be affixed to and rotatable with the top and bottom split shafts 64a, 65a, respectively. The first top and bottom split gears 64b, 65b, in turn, may be intermeshed with an output gear 63b, which in the embodiment pictured herein combines two rotational energy sources into one single source transferred to the output shaft 63a, to which the output gear 63b may be affixed and with which the output gear 63b may be rotatable. The first and second top split gears 64b, 64c, first and second left split gears 65b, 65c are one type of rotational energy combing member, but other structures and/or methods known to those skilled in the art may be used to divide the rotational energy of the output shaft 62.

As with the first frame 20 and center frame 30, the components of the second frame 60 may be separately formed and then joined together, or they may be integrally formed as one continuous structure. The material used to construct the second frame 60 and/or the various components thereof may be any material known to those skilled in the art and suitable for the particular application. Such materials may include metals, alloys, synthetic materials such as polymers, wood, combinations thereof, or any other material known to those skilled in the art.

In the embodiment of the epicyclic joint 10 pictured herein, the center frame 30 in combination with the second right, left, top, and bottom miter gears 31c, 35c, 41c, 45c, respectively serves as a type of translator. That is, the various elements associated with these components of the center frame 30 function to translate the axis of rotation for rotational energy into a different orientation, which in the embodiment pictured herein is from an axis that is generally horizontal to one that is generally vertical.

The epicyclic joint 10 is not limited by the number of planet gears 74 used for any of the planetary gear sets. Accordingly, any type of planetary gear set may be used with the epicyclic joint 10 without departing from the spirit and scope of the present invention. Furthermore, as previously mentioned, in light of the preceding disclosure, it will be apparent to those skilled in the art that a differential gear set may be used with the epicyclic joint 10 in place of a planetary gear set. Therefore, the specific type of epicyclic gear set used with the epicyclic joint 10 in no way limits the scope of the epicyclic joint 10, and any type of epicyclic gear set known to those skilled in the art may be used with epicyclic joint 10 without departing from the spirit and scope thereof.

In other embodiments of the epicyclic joint 10 not pictured herein, other structures and/or methods other than the right transfer shaft 27a and associated right transfer gears 27b, 27c, left transfer shaft 29a and associated left transfer gears 29b, 29, top transfer shaft 67a and associated top transfer gears 67b, 67c, and bottom transfer shaft 69a and associated bottom transfer gears 69b, 69c may be used to transport the rotational energy from a rotating member positioned on the first frame 20 to the center frame 30 and/or from the center frame 30 to the second frame 60. For example, large spur gears (not shown) may be used, as may chains with sprockets, or any other structure and/or method known to those skilled in the art.

In light of the present disclosure, it will be obvious to those skilled in the art that the symmetry associated with the embodiment of the epicyclic joint 10 shown in the various figures herein possesses certain inherent advantages. The input rotational energy is symmetrically divided about the first frame 20, which rotational energy is then symmetrically translated by ninety degrees about the center frame 30, which rotational energy is then transmitted along the second frame 60 before being combined into one rotational energy output at the output shaft 63a.

Other embodiments of the epicyclic joint 10 may not require the level of symmetry contained in the embodiment pictured herein. In fact, in other applications it is contemplated that non-symmetrical configurations may be advantageous. For example, in another embodiment of the epicyclic joint not pictured herein, the rotational energy is not symmetrically divided about the first frame 20 and/or not symmetrically translated about the center frame 30. Furthermore, the rotational energy may be transferred along the second frame 60 and combined adjacent thereto in a non-symmetrical fashion. Such non-symmetrical embodiments of the epicyclic joint 10 may employ torque vectoring apparatuses, such as that disclosed in U.S. Pat. No. 7,491,147, which is incorporated herein in its entirety.

As will be obvious to those skilled in the art in light of the present disclosure and accompanying drawings, the length of the first frame 20 with respect to the size of the center frame 30 and second frame 60 is an important factor in determining how far the first frame may rotate with respect to the center frame 30 about the first axis of rotation 12. For example, if the first frame 20 is sufficiently lengthened with respect to the second frame 60, but the center frame 30 remains in proportion to the second frame 60 as shown in the various figures contained herein, the epicyclic joint 10 may be configured to allow the first frame 20 to rotate three hundred and sixty degrees with respect to the center frame 30 about the first axis of rotation 12. In a similar manner, the epicyclic joint 10 may be configured to allow the second frame 60 to rotate three hundred and sixty degrees with respect to the center frame 30 about the second axis of rotation 14. Accordingly, the degree of freedom of motion for either the first frame 20 or second frame 60 with respect to one another or the center frame 30 in no way limits the scope of the epicyclic joint 10 as disclosed and claimed herein.

It will be apparent to those skilled in the art in light of the present disclosure that the epicyclic joint 10 may be configured with more than two axes of rotation. In such an embodiment, another frame similar to the center frame 30 would be positioned adjacent the second frame 60 for engagement therewith. The output shaft 63a could be affixed to and rotatable with a miter gear (not shown), the cooperated with two other miter gears (not shown) to divide the rotational energy of the output shaft 63a into corresponding phases. The orientation of various axes of rotation of such an epicyclic joint 10 may be configured differently depending on the specific application, as may the maximum angle or rotation of any component about such an axis. The fact that the first and second axes of rotation 12, 14 are perpendicular to one another and that both are perpendicular to the longitudinal axis of the input shaft 23a in the embodiment pictured herein is in no way limiting. Accordingly, the epicyclic joint 10 may be used with any number of rotational axes in any number of orientations within the spirit and scope of the epicyclic joint 10 as disclosed and claimed herein.

The various advantages of the epicyclic joint 10 as disclosed and described herein will be apparent to those skilled in the art in light of the present disclosure. For example, one advantage the epicyclic joint 10 is increased range of motion about the first and second axes of rotation 12, 14. In the embodiment pictured herein, the range of motion for each axis of rotation 12, 14 may greater than two hundred and seventy degrees. As explained above, in other embodiments not pictured herein the range of motion for one axis 12, 14 may be as large as 360 degrees. Another advantage of the epicyclic joint 10 is the lack of rotating frame members. In the epicyclic joint 10, the first frame 20, central frame 30, and second frame 60 do not rotate in a manner dependent on the rotational energy of any of the components thereof. Instead, the first, center, and second frames 20, 30, 60 rotate about either the first axis of rotation 12 and/or the second axis of rotation 14 so that the epicyclic joint 10 may be oriented in the most advantageous direction for the specific application. The compensators (first compensation shaft and gears 53a, 53b and second compensation shaft and gears 55a, 55b in the embodiment pictured herein) allow the epicyclic joint 10 to be configured in an infinite number of orientations without additional shock, vibrations, or other perturbations imparted to the other components of the epicyclic joint 10 as rotational energy is being transmitted through the epicyclic joint 10.

The epicyclic joint 10 and various elements thereof may be constructed of any suitable material known to those skilled in the art. In the embodiment as pictured herein, it is contemplated that various frame elements, shaft elements, and gear elements will be constructed of metal, aluminum, metallic or aluminum alloys, polymers, or combinations thereof. However, other suitable materials may be used.

Other methods of using the epicyclic joint 10 will become apparent to those skilled in the art in light of the present disclosure. Accordingly, the methods and embodiments pictured and described herein are for exemplary purposes only, and are not intended to limit the scope of the epicyclic joint 10 in any way. The scope of the epicyclic joint 10 is not limited by the embodiments pictured and described herein, but is intended to apply to all similar apparatuses and methods for allowing a rotational energy to be transmitted about one or more axes or rotation, which one or more axes or rotation are distinct from the axis of rotation of the rotational energy source. Modifications and alterations from the described embodiments will occur to those skilled in the art without departure from the spirit and scope of the epicyclic joint 10.

It is understood that the epicyclic joint 10 as disclosed and defined herein extends to all alternative combinations of two or more of the individual features mentioned or evident from the text and/or drawings. All of these different combinations constitute various alternative aspects of the epicyclic joint 10. The embodiments described herein explain the best modes known for practicing the epicyclic joint 10 and will enable others skilled in the art to utilize the same. The claims are to be construed to include alternative embodiments to the extent permitted by the prior art.

The invention claimed is:

1. An epicyclic joint comprising:
   a. a first frame;
   b. an input shaft pivotally supported by said first frame;
   c. a rotational energy dividing member, wherein said rotational energy dividing member divides the rotational energy from said input shaft into two component rotational energies;
   d. a first transfer member pivotally supported by said first frame, wherein said first transfer member is operatively engaged with said rotational energy dividing member;
   e. a second transfer member pivotally supported by said second frame, wherein said second transfer member is operatively engaged with said rotational energy dividing member;
   f. a second frame;
   g. a first epicyclic gearhead pivotally supported by said second frame, wherein said first epicyclic gearhead is cooperatively engaged with said first transfer member;
   h. a second epicyclic gearhead pivotally supported by said second frame, wherein said second epicyclic gearhead is cooperatively engaged with said second transfer member;
   i. a compensator pivotally supported by said second frame, wherein said compensator is cooperatively engaged with said first and second epicyclic gearhead such that said compensator creates an axis of rotation between said first frame and said second frame, wherein said axis of rotation is parallel to that of said compensator; and
   j. a center translator pivotally supported by said second frame, wherein said center translator is cooperatively engaged with said first and second epicyclic gearheads.

2. The epicyclic joint according to claim 1 wherein said first and second transfer members are further defined as being symmetrically oriented with respect to one another and with respect to said input shaft.

3. The epicyclic joint according to claim 1 wherein said first and second epicyclic gearheads are further defined as being planetary gearheads.

4. The epicyclic joint according to claim 1 further comprising:
   a. a third frame;
   b. a third epicyclic gearhead pivotally supported by said second frame;
   c. a fourth epicyclic gearhead pivotally supported by said second frame;
   d. a second compensator pivotally supported by said second frame, wherein said second compensator is cooperatively engaged with said third and fourth epicyclic gearheads such that said compensator creates an axis of rotation between said second frame and said third frame, wherein said axis of rotation is parallel to that of said second compensator;
e. a second center translator pivotally supported by said second frame, wherein said center translator is cooperatively engaged with at least said third and fourth epicyclic gearheads;
f. a third transfer member pivotally supported by said third frame, wherein said third transfer member is operatively engaged with said second center translator;
g. a fourth transfer member pivotally supported by said third frame, wherein said fourth transfer member is operatively engaged with said second center translator; and
h. a third translator pivotally supported by said third frame, wherein said third translator is cooperatively engaged with said third and fourth transfer members.

5. The epicyclic joint according to claim 4 wherein said axis of rotation between said first and second frames is further defined as being perpendicular to said axis of rotation between said second and third frames.

6. The epicyclic joint according to claim 4 wherein the said third transfer member and said second transfer member are further defined as have parallel axes of rotation.

7. The epicyclic joint according to claim 6 further comprising:
a. a fourth frame;
b. a fifth epicyclic gearhead pivotally supported by said fourth frame;
c. a sixth epicyclic gearhead pivotally supported by said fourth frame;
d. a third compensator pivotally supported by said fourth frame, wherein said third compensator is cooperatively engaged with said fifth and sixth epicyclic gearheads such that said compensator creates an axis of rotation between said third frame and said fourth frame, wherein said axis of rotation is parallel to that of said third compensator; and
e. an output translator pivotally supported by said fourth frame, wherein said output translator is cooperatively engaged with said fifth and sixth epicyclic gearheads.

8. The epicyclic joint according to claim 7 wherein said axis of rotation between said first frame and said second frame is further defined as being parallel to said axis of rotation between said third and fourth frames.

9. An epicyclic joint comprising:
a. a first frame, wherein said first frame includes a first frame splitter support, a right transfer support, and a left transfer support;
b. an input shaft pivotally supported by said first frame splitter support;
c. an input gear fixedly mounted to said input shaft;
d. a right split shaft pivotally supported by said first frame splitter support;
e. a first right split gear affixed to said right split shaft, wherein said first right split gear is intermeshed with said input gear;
f. a second right split gear affixed to said right split shaft;
g. a left split shaft pivotally supported by said first frame splitter support;
h. a first left split gear affixed to said left split shaft, wherein said first left split gear is intermeshed with said input gear;
i. a second left split gear affixed to said left split shaft;
j. a right transfer shaft pivotally supported by said right transfer support;
k. a first right transfer gear affixed to said right transfer shaft, wherein said first right transfer gear is intermeshed with said second right split gear;
l. a second right transfer gear affixed to said right transfer shaft;
m. a left transfer shaft pivotally supported by said left transfer support;
n. a first left transfer gear affixed to said left transfer shaft, wherein said first left transfer gear is intermeshed with said second left split gear;
o. a second left transfer gear affixed to said left transfer shaft;
p. a center frame configured with a plurality of journals therein, wherein said center frame includes a first and second compensation shaft support;
q. a first compensation shaft pivotally supported by said first compensation shaft support;
r. two first compensation gears affixed to said first compensation shaft;
s. a second compensation shaft pivotally supported by said second compensation shaft support;
t. two second compensation gears affixed to said second compensation shaft;
u. a right, left, top, and bottom planetary gear head, each said planetary gear head comprising:
  i. a sun gear;
  ii. a planet carrier;
  iii. a plurality of planet gears pivotally mounted to said planet carrier, wherein each said planet gear is intermeshed with said sun gear; and
  iv. an annulus, wherein a portion of the exterior of said annulus is pivotally engaged with a respective one of said journals formed in said center frame, and wherein said plurality of planet gears are intermeshed with said annulus;
v. a right center shaft pivotally supported by said first frame, wherein said sun gear of said right planetary gear head is affixed to said right center shaft;
w. a first right miter gear affixed to said right center shaft, wherein said first right miter gear is intermeshed with said second right transfer gear;
x. a right spur gear affixed to said annulus of said right planetary gear head, wherein said right spur gear is intermeshed with one of said first compensation gears;
y. a second right miter gear affixed to said planet carrier of said right planetary gear head;
z. a left center shaft pivotally supported by said first frame, wherein said sun gear of said left planetary gear head is affixed to said left center shaft;
aa. a first left miter gear affixed to said left center shaft, wherein said first left miter gear is intermeshed with said second left transfer gear;
bb. a left spur gear affixed to said annulus of said left planetary gear head, wherein said left spur gear is intermeshed with one of said first compensation gears;
cc. a second left miter gear affixed to said planet carrier of said left planetary gear head;
dd. a top center shaft, wherein said sun gear of said top planetary gear head is affixed to said top center shaft;
ee. a first top miter gear affixed to said top center shaft;
ff. a top spur gear affixed to said annulus of said top planetary gear head, wherein said top spur gear is intermeshed with one of said second compensation gears;
gg. a second top miter gear affixed to said planet carrier of said top planetary gear head;

hh. a bottom center shaft, wherein said sun gear of said bottom planetary gear head is affixed to said bottom center shaft;

ii. a first bottom miter gear affixed to said bottom center shaft;

jj. a bottom spur gear affixed to said annulus of said bottom planetary gear head, wherein said bottom spur gear is intermeshed with one of said second compensation gears;

kk. a second bottom miter gear affixed to said planet carrier of said bottom planetary gear head, wherein said second right miter gear, said second left miter gear, said second top miter gear, and said second bottom miter gear are all intermeshed with one another;

ll. a second frame, wherein said second frame includes a second frame splitter support, a top transfer support, and a bottom transfer support, and wherein said top center shaft and said bottom center shaft are pivotally supported by said second frame;

mm. an output shaft pivotally supported by said second frame splitter support;

nn. an output gear fixedly mounted to said output shaft;

oo. a top split shaft pivotally supported by said second frame splitter support;

pp. a first top split gear affixed to said top split shaft, wherein said first top split gear is intermeshed with said output gear;

qq. a second top split gear affixed to said top split shaft;

rr. a bottom split shaft pivotally supported by said second frame splitter support;

ss. a first bottom split gear affixed to said bottom split shaft, wherein said first bottom split gear is intermeshed with said output gear;

tt. a second bottom split gear affixed to said bottom split shaft;

uu. a top transfer shaft pivotally supported by said top transfer support;

vv. a first top transfer gear affixed to said top transfer shaft, wherein said first top transfer gear is intermeshed with said second top split gear;

ww. a second top transfer gear affixed to said top transfer shaft, wherein said second top transfer gear is intermeshed with said first top miter gear;

xx. a bottom transfer shaft pivotally supported by said bottom transfer support;

yy. a first bottom transfer gear affixed to said bottom transfer shaft, wherein said first bottom transfer gear is intermeshed with said second bottom split gear; and zz. a second bottom transfer gear affixed to said bottom transfer shaft, wherein said second bottom transfer gear is intermeshed with said first bottom miter gear.

10. The epicyclic joint according to claim 9 wherein said first frame is symmetrically oriented with respect to said input shaft.

11. The epicyclic joint according to claim 9 wherein said second frame is symmetrically oriented with respect to said output shaft.

12. The epicyclic joint according to claim 9 wherein said center frame is generally square in shape, and wherein said center frame is symmetrically oriented with respect to said input first frame and said second frame.

13. The epicyclic joint according to claim 9 wherein said first frame and said second frame share the same general dimensions for analogous portions thereof.

14. The epicyclic joint according to claim 9 wherein said epicyclic joint is further defined as having a first and second axis of rotation, wherein said first axis of rotation is parallel to said right center shaft and said left center shaft, and wherein said second axis of rotation is parallel to said top center shaft and said bottom center shaft.

15. The epicyclic joint according to claim 14 wherein said first frame is larger than said second frame such that said first frame may rotate three hundred and sixty degrees with respect to said center frame about said first axis of rotation.

16. A method of providing an epicyclic joint comprising the steps:

a. splitting a rotational power source into two components;

b. transferring each said component to a distinct epicyclic gearhead, wherein four said epicyclic gearheads are arranged to provide two axes of rotation;

c. engaging each said epicyclic gearhead with at least one compensator, such that each said at least one compensator moves about each respective epicyclic gearhead to account for angular changes of said rotational power source with respect to at least one of said epicyclic gearheads; and, d. transferring the rotational energy from at least one of said epicyclic gearheads to an output shaft.

17. The method of providing an epicyclic joint according to claim 16 wherein said method is further defined as utilizing a total of four epicyclic gearheads.

* * * * *